United States Patent Office 2,773,893
Patented Dec. 11, 1956

2,773,893

CARBOXYLIC ACIDS OF THE DICYCLOHEXYL ETHANE SERIES, AND A PROCESS OF MAKING SAME

Erich M. H. Radde, New York, N. Y.

No Drawing. Application November 20, 1953,
Serial No. 393,503

Claims priority, application Germany December 2, 1949

7 Claims. (Cl. 260—488)

This invention relates to dicyclohexyl ethane compounds, and more particularly to dicyclohexyl ethane compounds substituted by alkyl residues, and a method of producing same.

The present invention is a continuation-in-part application of my co-pending application Serial No. 193,275, filed October 31, 1950, relating to "Dicyclohexyl ethane compounds and a method of making same," now Patent No. 2,661,369 of December 1953. Said co-pending application refers to (p-cyclohexenonyl)-(p-hydroxy aceto cyclohexanyl)-diethyl ethane compounds of the following formula $$\begin{array}{c}\text{CH}=\text{CH} \\ \text{O}=\text{C} \\ \text{CH}_2-\text{CH}_2\end{array}\begin{array}{c}\text{CH}_2-\text{CH}_2 \\ \text{CH}-\text{CH}_2-\text{CH}_2-\text{CH} \\ \text{C}_2\text{H}_5\ \text{C}_2\text{H}_5\end{array}\begin{array}{c}\text{CH}_2-\text{CH}_2 \\ \text{CH}_2-\text{CH}_2\end{array}\begin{array}{c}\text{CO.CH}_2\text{X} \\ \text{C} \\ \text{H}\end{array}$$

wherein X represents a member selected from the group consisting of a hydroxyl group and an acyloxy group.

It is one object of this invention to provide new chemical compounds of the following formula $$\underset{H}{\overset{X'}{\diagdown}}\!\!\left<\!A\!\right>\!\!-\!\!\underset{R}{\overset{}{\text{CH}}}\!\!-\!\!\underset{R'}{\overset{}{\text{CH}}}\!\!-\!\!\left<\!B\!\right>\!\!\underset{OH}{\overset{COOH}{\diagup}}$$

and $$\underset{H}{\overset{X'}{\diagdown}}\!\!\left<\!A\!\right>\!\!-\!\!\underset{R}{\overset{}{\text{CH}}}\!\!-\!\!\underset{R'}{\overset{}{\text{CH}}}\!\!-\!\!\left<\!B\!\right>\!\!\underset{H}{\overset{COOH}{\diagup}}$$

wherein R and R' are alkyl radicals and especially ethyl radicals while X' represents a secondary alcohol group or a group convertible by hydrolysis into said secondary alcohol group, especially an ester group. The cyclohexyl nuclei A and B may be saturated but they may also contain a double bond.

Another object of this invention is to provide compounds of the formula $$X=\!\!\left<\!A\!\right>\!\!-\!\!\underset{R}{\overset{}{\text{CH}}}\!\!-\!\!\underset{R'}{\overset{}{\text{CH}}}\!\!-\!\!\left<\!B\!\right>\!\!\underset{Z}{\overset{X}{\diagup}}$$

wherein X represents a keto or secondary alcohol group or a group convertible by hydrolysis into said keto or secondary alcohol group, Z is hydrogen or a hydroxyl group, and R and R' are alkyl radicals and especially ethyl radicals and wherein rings A and/or B may contain double bonds, while Y represents a substituent selected from the group consisting of the carboxyl group and groups convertible thereinto, such as its salts, its esters, halogenides, amides, nitriles and the like.

A further object of this invention is to provide methods for producing said compounds by using compounds of the following formula as starting materials:

$$X=\!\!\left<\!A\!\right>\!\!-\!\!\underset{R}{\overset{}{\text{CH}}}\!\!-\!\!\underset{R'}{\overset{}{\text{CH}}}\!\!-\!\!\left<\!B\!\right>\!\!=\!K$$

wherein X is a keto or a secondary alcohol group or a group convertible by hydrolysis into said groups and R and R' indicate the same groups as stated above while K is a keto group. Rings A and/or B may contain double bonds. Such starting materials are described, for instance, in French Patent 872,058 which relates to hydroxy ketones or diketones respectively of dicyclohexane dialkyl ethane compounds which are derived from the corresponding dialkyl stilbestrol compounds.

Other objects of this invention will be apparent from the specification and the claims attached thereto.

Compounds having the activity of adrenocortical hormones may be produced by saponifying, for instance, the cyanohydrin obtained on reacting (p-acyloxy cyclohexanyl) (p-cyclohexanonyl) diethyl ethanes with hydrocyanic acid, to the corresponding carboxylic acid, protecting the secondary hydroxyl group in the one cyclohexane ring against the action of the subsequently used reagents, for instance, by acylation, splitting off water between the tertiary hydroxyl group and the neighboring methylene group of the other cyclohexane ring, hydrogenating the double bond formed thereby, transforming the saturated carboxylic acid into the acid halogenide, especially into the acid chloride, reacting the said acid halogenide with diazomethane, decomposing the diazoketone obtained to a hydroxy acetocyclohexane compound, transforming the secondary alcohol group in the other cyclohexane ring into the keto group and establishing, if required, a double bond in said ring by bromination and splitting off of hydrogen bromide.

This reaction may be illustrated by the following formulas whereby A and B have the same meaning as stated above while A' is a cyclohexene ring of the following structure $$=\text{C}\!\!\begin{array}{c}\text{CH}=\text{CH} \\ \text{CH}_2-\text{CH}_2\end{array}\!\!\text{CH}-$$

and B' is a cyclohexene ring of the following structure $$-\text{CH}\!\!\begin{array}{c}\text{CH}_2-\text{CH}_2 \\ \text{CH}_2-\text{CH}_2\end{array}\!\!\text{C}=$$

$$\text{CH}_3.\text{COO}-\text{C}\!\!\begin{array}{c}\text{CH}_2-\text{CH}_2 \\ \text{CH}_2-\text{CH}_2\end{array}\!\!\text{CH}-\underset{\text{C}_2\text{H}_5}{\text{CH}}-\underset{\text{C}_2\text{H}_5}{\text{CH}}-\text{CH}\!\!\begin{array}{c}\text{CH}_2-\text{CH}_2 \\ \text{CH}_2-\text{CH}_2\end{array}\!\!\text{C}\!\!\begin{array}{c}\text{CN} \\ \text{OH}\end{array}$$

↓ Hydrolysis $$\underset{H}{\overset{HO}{\diagdown}}\!\!\left<\!A\!\right>\!\!-\!\!\underset{\text{C}_2\text{H}_5}{\overset{}{\text{CH}}}\!\!-\!\!\underset{\text{C}_2\text{H}_5}{\overset{}{\text{CH}}}\!\!-\!\!\left<\!B\!\right>\!\!\underset{OH}{\overset{COOH}{\diagup}}$$

↓ Acylation $$\underset{H}{\overset{\text{CH}_3.\text{COO}}{\diagdown}}\!\!\left<\!A\!\right>\!\!-\!\!\underset{\text{C}_2\text{H}_5}{\overset{}{\text{CH}}}\!\!-\!\!\underset{\text{C}_2\text{H}_5}{\overset{}{\text{CH}}}\!\!-\!\!\left<\!B\!\right>\!\!\underset{OH}{\overset{COOH}{\diagup}}$$

↓ $-\text{H}_2\text{O}$ $$\underset{H}{\overset{\text{CH}_3.\text{COO}}{\diagdown}}\!\!\left<\!A\!\right>\!\!-\!\!\underset{\text{C}_2\text{H}_5}{\overset{}{\text{CH}}}\!\!-\!\!\underset{\text{C}_2\text{H}_5}{\overset{}{\text{CH}}}\!\!-\!\!\left<\!B'\!\right>\!\!-\text{COOH}$$

↓ Hydrogenisation $$\underset{H}{\overset{\text{CH}_3.\text{COO}}{\diagdown}}\!\!\left<\!A\!\right>\!\!-\!\!\underset{\text{C}_2\text{H}_5}{\overset{}{\text{CH}}}\!\!-\!\!\underset{\text{C}_2\text{H}_5}{\overset{}{\text{CH}}}\!\!-\!\!\left<\!B\!\right>\!\!\underset{H}{\overset{COOH}{\diagup}}$$

↓ $+\text{SOCl}_2$

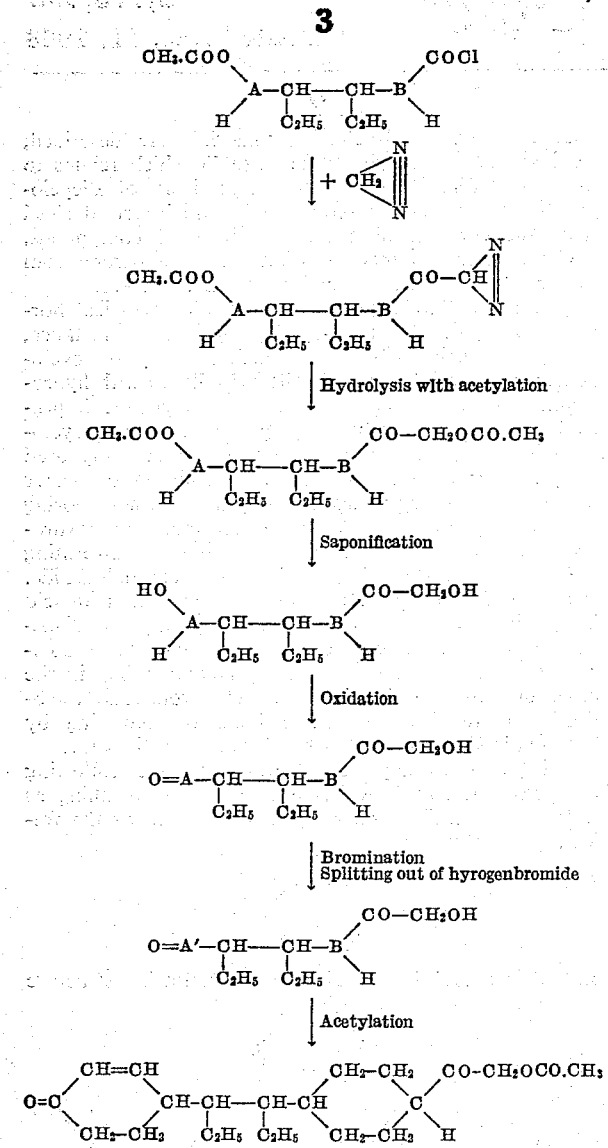

As can be seen from the foregoing, the present invention consists in principle in subjecting the starting material which has one free keto group, to reactions as they are known to the art and especially in steroid hormone chemistry, whereby side chains are introduced into the molecule, said side chains corresponding in structure to the side chains present in said steroid hormones.

The new α,β-substituted diethyl ethane compounds obtained according to the present invention correspond to the following formula

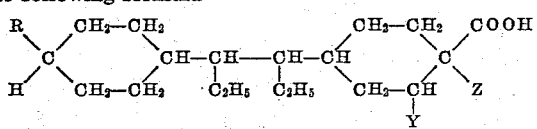

wherein R is a member selected from the group consisting of the hydroxyl group and an acyloxy group while Z is a member selected from the group consisting of hydrogen and a hydroxyl group and Y is a member selected from the group consisting of hydrogen and, together with Z, a double bond between the two carbon atoms to which said Y and Z are attached.

The following example serves to illustrate the invention, without, however, limiting the same thereto.

*Example*

25 g. of (p-acetoxy cyclohexanyl)(p-cyclohexanoyl) diethyl ethane obtained, for instance, according to French Patent 872,058, Examples 8 or 10, are heated with 100 g. of anhydrous hydrocyanic acid in an autoclave for about 4 hours at 50° C. Thereafter the unreacted hydrocyanic acid is evaporated and the cyanohydrin obtained is purified by recrystallisation from ethanol.

10 g. of said cyanohydrin are heated with 50 cc. of a solution of 3.0 g. sodium hydroxide in ethanol and 50 cc. of water in a sealed glass tube for 2 hours at 180° C., the reaction mixture is poured into water, acidified with dilute sulfuric acid, and the precipitated hydroxy carboxylic acid of the formula

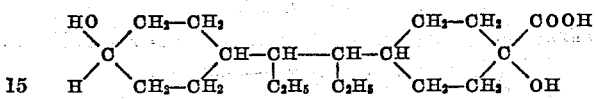

is separated.

10 g. of said acid are then allowed to stand at 20° C. with 40 cc. of dry pyridin and 40 cc. of acetic acid anhydride for 24 hours, the reaction mixture is poured in water, the precipitated monocetate of the formula

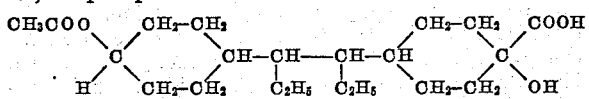

is washed with water, and is several times recrystallized from alcohol.

In order to split off water between the tertiary hydroxyl group and the neighboring methylene radical 5g of said monoacetate are heated under reflux with 25 cc. of pyridine and 2.5 g. of phosphorous oxychloride for half an hour, the reaction mixture is then poured into a mixture of ice and hydrochloric acid, the acid mixture is extracted with ether and the residue obtained is purified by crystallisation from aqueous acetone. The resulting unsaturated acid corresponds to the formula

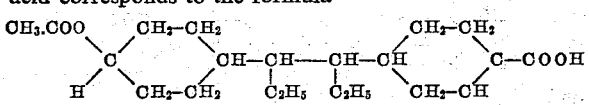

5 g. of said unsaturated acid are disolved in 250 cc. of ethyl acetate and are then hydrogenated in a shaking apparatus with hydrogen in the presence of a palladium-calcium carbonate catalyst. After filtering off the catalyst the solvent is distilled off and the remaining saturated acid of the formula

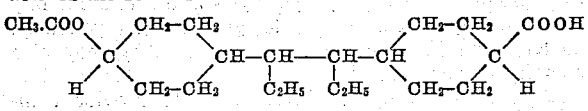

is purified by crystallisation from alcohol or any other suitable solvent. Hydrolysis thereof yields the acid of the formula

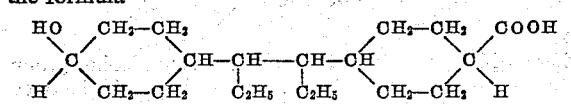

5 g. of the saturated acid are boiled under reflux in 25 cc. of anhydrous benzene with 25 cc. of purest thionyl chloride for 3 hours, whereby care is taken that moisture is excluded. Thereafter the benzene as well as the excess of thionyl chloride are distilled off in a vacuum.

The remaining acid chloride is disolved in 50 cc. of anhydrous ether and the solution is poured into 50 cc. of an anhydrous ethereal diazomethane solution containing 5 g. of freshly prepared diazomethane, said solution being cooled to −10° C. Within the next 2 hours the temperature is gradually raised to room temperature and the solution is allowed to stand over night. After filtration, the filtrate is evaporated almost to dryness in vacuo and the diazoketone formed is precipitated from its concentrated ethereal solution by the addition of petrol ether.

The precipitated diazoketone is then dissolved in 100 cc. of methanol and the solution mixed with 50 cc. of a 5% methanolic potassium hydroxide solution. The mixture is allowed to stand over night, water is added, the methanol is evaporated in vacuo, and the remaining saponified diazoketone is dissolved in ether. After drying the ethereal solution, the ether is removed by evaporation from a water bath and finally by vacuum distillation.

The diazoketone is then heated with 20 cc. of glacial acetic acid to 90° C., until no more nitrogen is developed. On cooling the corresponding hydroxy ketone is obtained.

2 g. of the same are allowed to stand over night with a solution of 1.5 g of chromium trioxide in 95 cc. of glacial acetic acid and 5 cc. of water. The reaction mixture is poured into much water and is extracted several times with ether.

The (acetoxy acetocyclohexanyl) (cyclohexanonyl) diethyl ethane obtained after evaporation of the ether is then dissolved in 30 times its amount of chloroform.

To said solution a solution of bromine in chloroform is added drop by drop while stirring vigorously and cooling between —8° C. to —12° C. until 1 molecule of bromine has reacted to form the monobromo compound. The chloroform solution is washed with sodium bicarbonate solution and with water until neutral, is dried by means of sodium sulfate, and is subjected to vacuum distillation to remove the chloroform.

The residue is then boiled with 5 times its amount of dry pyridine for about 6 hours. The pyridine is distilled off in vacuum and the resdiue dissolved in ether. The ethereal solution is washed with dilute sulfuric acid, with sodium bicarbonate solution, and with water until neutral, and is dried with sodium sulfate. The ether is distilled off and the residue is purified by fractional distillation in a high vacuum. The (cyclohexenonyl) (acetoxyacetocyclohexanyl) diethyl ethane obtained has a corticosterone-like activity.

Of course, many changes and variations may be made by those skilled in the art in the reaction conditions, the reagents used, the methods of purifying the reaction products, and the like, in accordance with the principles set forth herein and in the claims annexed hereto. Thus, for instance, instead of the acetyl compounds, esters with other acids such as propionic acid, benzoic acid, phosphoric acid, stearic acid and others, or ethers, such as the methyl ether and others may be used as starting or intermediate compounds or may be produced as final products. The oxidation of the secondary alcohol group to the keto group may be carried out with other oxidizing agents instead of chromic acid, such as with permanganate, by the Meerwein-Ponndorf reaction and the like. The double bond in conjugation to the keto group may be introduced by other known means; for instance, splitting out of hydrogen bromide may be effected by means of dimethyl amiline, quinoline, and others. The addition of hydrocyanic acid to the cyclohexanone compound may be carried out in any other known manner. Splitting out water between the tertiary alcohol group and a neighboring methylene group in a cyclohexanolyl ring which contains a further substituent on the carbon atom carrying the tertiary alcohol group, may be effected by other means, as acetylchloride in acetic acid anhydride and others. Other catalysts than those mentioned may be employed for hydrogenating the double bond produced on splitting out water between said tertiary hydroxyl group and the neighboring methylene group, for instance, platinum catalysts, or said hydrogenation may be carried out by chemical means. The ketonic intermediate and end products may be purified not only by fractional crystallisation from suitable solvents, but also by converting them into insoluble ketonic condensation products, for instance, with thiosemicarbazide, phenylhydrazine and others, besides those mentioned in the examples. The keto compound may be reformed from said ketonic derivatives not only by hydrolysis by means of acids and the like, but also by reacting said derivatives with other aldehydes or ketones, such as benzaldehyde and others.

The ester and ether derivatives of the new carboxylic acids may contain ester and ether residues as they are conventionally used in steroid chemistry for protecting hydroxyl groups. By saponifying (p-acetoxy cyclohexanyl) (p-carboxy cyclohexenyl) diethyl ethane or (p-acetoxy cyclohexanyl) (p-carboxy cyclohexanyl) diethyl ethane, as they are obtained according to the above given example, the free (p-hydroxy cyclohexanyl) (p-carboxy cyclohexenyl) diethyl ethane or (p-hydroxy cyclohexanyl) (p-carboxy cyclohexanyl) diethyl ethane compounds are obtained which hydroxy carboxylic acids are also valuable intermediates.

What I claim is:

1. An α,β-substituted diethyl ethane compound of the formula

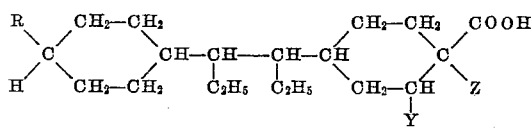

wherein R is a member selected from the group consisting of the hydroxyl group and an acyloxy group, while Z is a member selected from the group consisting of hydrogen and a hydroxyl group, and Y is a member selected from the group consisting of hydrogen and, together with Z, a double bond between the two carbon atoms to which said Y and Z are attached.

2. A di-(cyclohexyl)diethyl ethane carboxylic acid compound of the following formula

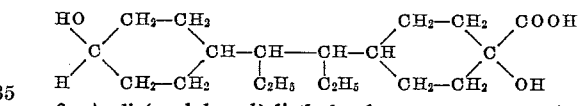

3. A di-(cyclohexyl)diethyl ethane compound of the following formula

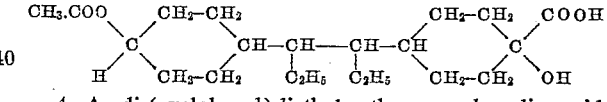

4. A di-(cyclohexyl)diethyl ethane carboxylic acid compound of the following formula

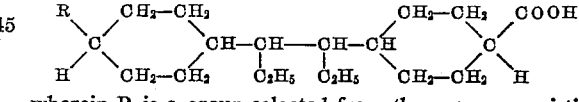

wherein R is a group selected from the groups consisting of the hydroxyl group and an acyloxy group.

5. A di-(cyclohexyl)diethyl ethane compound of the following formula

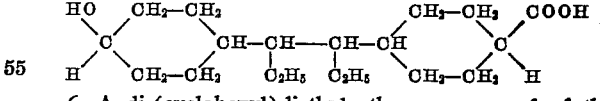

6. A di-(cyclohexyl)diethyl ethane compound of the following formula

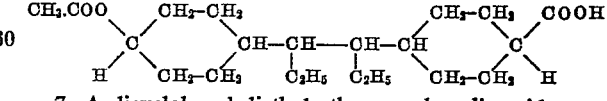

7. A dicyclohexyl diethyl ethane carboxylic acid compound of the following formula

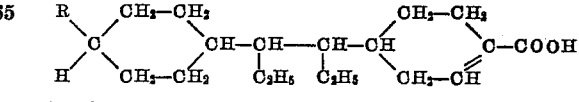

wherein R is a group selected from the groups consisting of the hydroxyl group and an acyloxy group.

References Cited in the file of this patent

UNITED STATES PATENTS 2,661,369     Radde _____ Dec. 1, 1953